US012500020B2

(12) United States Patent
Avestruz et al.

(10) Patent No.: US 12,500,020 B2

(45) Date of Patent: Dec. 16, 2025

(54) FIELD CANCELLATION FOR COIL-SURROUNDED CIRCUITRY

(71) Applicant: The Regents of the University of Michigan, Ann Arbor, MI (US)

(72) Inventors: Al-Thaddeus Avestruz, Ann Arbor, MI (US); Xin Zan, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 284 days.

(21) Appl. No.: 18/123,507

(22) Filed: Mar. 20, 2023

(65) Prior Publication Data

US 2023/0298793 A1 Sep. 21, 2023

Related U.S. Application Data

(60) Provisional application No. 63/321,956, filed on Mar. 21, 2022.

(51) Int. Cl.

*H01F 7/06* (2006.01)
*H01F 27/24* (2006.01)
*H01F 27/28* (2006.01)

(52) U.S. Cl.

CPC ............ *H01F 7/064* (2013.01); *H01F 27/24* (2013.01); *H01F 27/28* (2013.01)

(58) Field of Classification Search

CPC .......... H01F 7/064; H01F 27/24; H01F 27/28; H01F 38/14; H01F 2038/146

See application file for complete search history.

(56) References Cited

U.S. PATENT DOCUMENTS

| | | | | |
|---|---|---|---|---|
| 9,030,052 B2 * | 5/2015 | Kim | H04B 5/79 | |
| | | | 307/104 | |
| 10,199,163 B2 * | 2/2019 | Naruse | H01F 17/04 | |
| 10,224,749 B2 * | 3/2019 | Lee | H02J 50/40 | |
| 10,411,492 B2 * | 9/2019 | Yao | H02J 50/12 | |
| 2020/0111605 A1 * | 4/2020 | Chayat | H01F 5/003 | |

OTHER PUBLICATIONS

A.-T. Avestruz et al., Single-sided AC magnetic fields for induction heating, Proc. 39th Annu. Conf. IEEE Ind. Electron. Soc., 2013, pp. 5052-5057.

(Continued)

*Primary Examiner* — Sean Kayes
*Assistant Examiner* — Samantha L Faubert
(74) *Attorney, Agent, or Firm* — Lempia Summerfield Katz LLC

(57) ABSTRACT

A field cancellation device includes a primary coil and a cancellation coil. The primary coil surrounds a primary volume. The cancellation coil is disposed at least in part within the primary volume. Upon simultaneous incidence of an input signal on both coils, the primary coil and the cancellation coil each generate a response to the signal input. The cancellation field associated with the response from the cancellation coil may cancel a portion of the field power in a protected volume, which is the part of the primary volume surrounded by the cancellation coil. The field cancellation device further includes a balancing inductor that controls the balance between the responses generated by the respective coils.

20 Claims, 4 Drawing Sheets

(56) References Cited

OTHER PUBLICATIONS

Apple, Magsafe Charger; Available: https://www.apple.com/shop/product/MHXH3AM/A/magsafe-charger; 2020, 2 pp.
E. S. Lee et al., A modularized IPT with magnetic shielding for a wide-range ubiquitous Wi-power zone, IEEE Trans. Power Electron., vol. 33, No. 11, pp. 9669-9690, Nov. 2018.
J. C. Simpson et al., Simple analytic expressions for the magnetic field of a circular current loop, NASA Kennedy Space Center, Florida, United States, pp. 1-13, 2001.
J. Kim and S. Ahn, Dual loop reactive shield application of wireless power transfer system for leakage magnetic field reduction and efficiency enhancement, IEEE Access, vol. 9, pp. 118307-118323, 2021.
J. M. Griffith and G. W. Pan; Time harmonic fields produced by circular current loops, IEEE Trans. Magn., vol. 47, No. 3, pp. 2029-2033, Aug. 2011.
J. Park et al., A resonant reactive shielding for planar wireless power transfer system in smartphone application, IEEE Trans. Electromagn. Compat., vol. 59, No. 2, pp. 695-703, Apr. 2017.
M. Liu et al., Analysis and design of a self-resonant rectenna for small-size and ultraloosely coupled MHz wireless power transfer applications; IEEE J. Emerg. Sel. Topics Ind. Electron., vol. 2, No. 4, Oct. 2021; Abstract—1 pp.
M. Mohammad et al., Modeling and design of passive shield to limit EMF emission and to minimize shield loss in unipolar wireless charging system for EV, IEEE Trans. Power Electron., vol. 34, No. 12, pp. 12235-12245, Dec. 2019.
Q. Zhu et al., Null-coupled electromagnetic field canceling coil for wireless power transfer system; IEEE Trans. Transport. Electrific., vol. 3, No. 2, pp. 464-473, Jun. 2017.
S. Cruciani et al., Active shielding design for wireless power transfer systems, IEEE Trans. Electromagn. Compat., vol. 61, No. 6, pp. 1953-1960, Dec. 2019.
S. Cruciani, et al.; Active shielding design and optimization of a wireless power transfer (WPT) system for automotive; Energies, vol. 13, No. 21; 2020; pp. 1-12.
S. Hong et al., A frequency-selective EMI reduction method for tightly coupled wireless power transfer systems using resonant frequency control of a shielding coil in smartphone application, IEEE Trans. Electromagn. Compat., vol. 61, No. 6, pp. 2031-2039, Dec. 2019.
T. Denison et al.; A 2μW 100nV/rtHz chopper-stabilized instrumentation amplifier for chronic measurement of neural field potentials; IEEE J. Solid-State Circuits, vol. 42, No. 12, pp. 2934-2945, Dec. 2007.
X. Zan and A. Avestruz; Performance comparisons of synchronous and uncontrolled rectifiers for 27.12 MHz wireless power transfer using CMCD converters; 2018 IEEE Energy Conversion Congress and Exposition (ECCE), Sep. 2018, pp. 2448-2455.
X. Zan and A. Avestruz; Wireless power transfer for implantable medical devices using piecewise resonance to achieve high peak-to-average power ratio; 2017 IEEE 18th Workshop on Control and Modeling for Power Electronics (COMPEL), Jul. 2017, pp. 1-8.
X. Zan and A. T.Avestruz, Isolated ultrafast gate driver with variable duty cycle for pulse and VHF power electronics, IEEE Trans. Power Electron., vol. 35, No. 12, pp. 12678-12685, Dec. 2020.
X. Zan and A.-T. Avestruz, 100 MHz symmetric current-mode class D wireless power transfer, IEEE Trans. Emerg. Sel. Topics Power Electron., vol. 11, No. 4, Aug. 2023, Abstract—1 pp.
Y. Shao, M. Liu, H. Zhang, and C. Ma; Dual-band wireless power transmitter with reconfigurable power amplifier and decoupling ring, Proc. 46th Annu. Conf. IEEE Ind. Electron. Soc., 2020, pp. 3889-3894.

* cited by examiner

FIELD CANCELLATION FOR COIL-SURROUNDED CIRCUITRY

PRIORITY

This application claims priority to U.S. Provisional Patent Application No. 63/321,956, filed Mar. 21, 2022, and titled Field Cancelation for Circuits Encircled by Wireless Power Transfer Coils, which is incorporated by reference herein in its entirety.

BACKGROUND

Technical Field

The disclosure relates generally to field cancellation for coil-surrounded circuitry.

Brief Description of Related Technology

Mobile and miniaturized electronics have given rise to a greater variety of locations in which electronics are embedded and/or used. For example, miniaturized mobile devices are increasingly used in healthcare applications where electronics are worn or implanted for long periods. Accordingly, there is increasing demand for power systems, such as batteries and wireless power transfer, able to sustain extended operation in locations with and/or limited capacity for device volume and/or device weight. Further, there is demand for compact signal communication devices. Improvements to power and communication technologies will continue to drive industrial demand.

DETAILED DESCRIPTION

Figure 1:
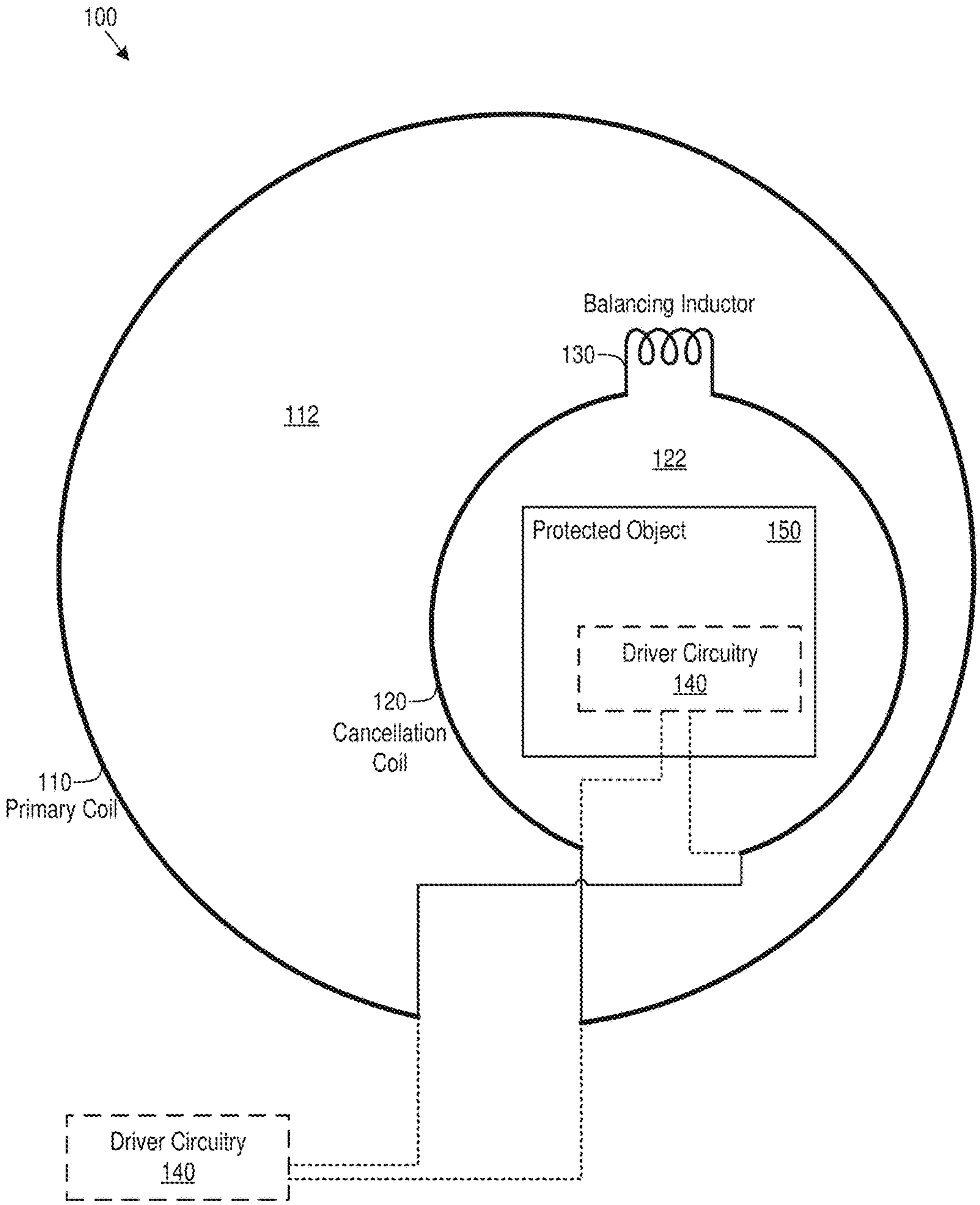
FIG. 1 shows an example field cancellation device.

In various contexts, a device may rely on the reception and/or transmission wireless signals that have the potential to interfere with circuitry of other field-sensitive objects surrounded by antenna coils that the device uses to receive and/or transmit the signals. Surrounding (e.g., circumscribing, encircling, wrapping, or otherwise surrounding) various circuitry portions of a device may allow for compact construction of the device because the surrounded electronics and antenna may occupy the same volume. In an illustrative example, cellphone radio-frequency (RF) antenna coils may surround the chassis of the cellphone. The phone circuitry may be within the chassis and surrounded by the antenna coils. The phone circuitry may include RF amplifiers, tuners, and/or other circuitry to drive operation of the antenna coils. Additionally or alternatively, the phone circuitry may include general purpose processors, display circuitry, memory devices, and/or other circuitry to manage operation of the phone. In an illustrative example, wireless power transfer (WPT) coils may surround WPT driver circuitry and/or other device circuitry that may be sensitive to the induced fields used to effect WPT. The induced fields may include RF-fields and/or other electromagnetic fields. In some cases, such as for WPT applications and/or RF signal communication, very-high frequency (VHF) and/or ultra-high frequency (UHF) fields may be used.

In some implementations, such compact devices may be used in space/weight limited applications such as for devices implanted into living organisms (e.g., such as healthcare devices implanted in humans, wildlife monitoring devices, farm-based applications, and/or other applications involving living organisms). Other applications where light-weight and/or compact devices may include RF identification (RFID) tags, smart devices, Internet-of-Things (IoT) devices, and/or other compact electronic device applications.

The coil-surrounded circuitry may be sensitive to the fields generated/received by the coils during operation of the device. This sensitivity may give rise to a demand for shielding and/or isolation of the field-sensitive circuitry and/or other field-sensitive objects. Additionally or alternatively, the sensitivity may be addressed by relocating the circuitry to a location not surrounded by the coils. However, displacing the circuitry may increase device size. To reduce and/or eliminate shielding and/or displacement demands, localized field cancellation may be used to reduce and/or eliminate the power of the generated/received incident on the circuitry while allowing the circuitry to remain within the volume surrounded by the coil.

In various implementations, a cancellation coil may be disposed within the volume surrounded by a "primary" coil used in the wireless application. For example, the primary coil may be configured to implement WPT and/or RF signal communication to support operation of an "application circuit" that performs the operations of the device.

Currents may circulate in the coils to induce (or be induced by) a magnetic field within the volume. The induced/inducing magnetic field may be time varying. Thus, electric fields may also be present and/or generated by the coils. The cancellation coil may be driven to cancel (at least in part) the strength of the field associated with the primary coil. The cancellation coil may be aligned with the primary coil such that the field generated by the cancellation coil may interfere with that generated/received by the primary coil.

Conventional systems use a dedicated driver to produce the signal for the cancellation coil to allow of optimization of the field cancellation. However, synchronization of the primary and cancellation signals requires additional timing control circuitry which may increase device size and cost. Nevertheless, according to the conventional wisdom, real-world optimization of primary and cancellation coils requires the use of two different driver signals to allow the necessary flexibility to actually effect cancellation where environmental conditions may vary over time and/or manufacturing specifications for electronic devices may vary within manufacturing tolerances.

The architectures and techniques discussed herein proceed contrary to the conventional wisdom by coordinating the driving of the primary and cancellation coils using a balancing inductor electrically-coupled (e.g., directly or indirectly) to the cancellation coil and disposed such that the field induced by the balancing inductor does not interfere with (or has negligible) interference with the fields generated by the cancellation coil and/or generated/received by the primary coil. For example, the balancing inductor may be aligned such that its induced field is orthogonal to the relevant fields of the cancellation and primary coils. In some cases, the balancing inductor may be disposed outside of the volume surrounded by the primary and/or cancellation coils.

In some cases, the induced field may be generated out of phase with primary and/or cancellation fields. In various implementations, different misalignments of the induced field may be used to ensure that the induced field does not contribute (and/or has its contributions minimized) to the interactions of the primary and cancellation fields.

The architectures and techniques discussed herein do not interfere with or inhibit various other cancellation techniques (including those which do not make use of a balancing inductor). Thus, cancellation architectures and techniques may be readily and optionally combined with various other field cancellation and/or shielding systems.

FIG. 1 shows an example field cancellation device 100. The field cancellation device 100 may include a primary coil 110 that surrounds a transfer volume 112. The transfer volume 112 may include the primary field and/or an incident transmitted field with a primary field strength (e.g., during operation of the device). The primary field and/or an incident transmitted field may be used for WPT, communication signal transfer (e.g., via RF communication signals), and/or for various other remote signaling applications. The primary field strength may vary over time (including varying in instantaneous power density and varying in average field strength over time).

The field cancellation device 100 may further include a cancellation coil 120 that surrounds a protected volume 122. The primary coil 110 surrounds the cancellation coil 120. Thus, the protected volume 122 overlaps, at least in part with the transfer volume 112. Within the protected volume 122, the cancellation field (e.g., during operation) cancels at least a portion of the primary field and/or incident transmitted field. As a result, the protected volume 122 may have a protected field strength that is lower than the primary field strength. The lower field strength of the protected volume 122 results in the integrated field strength over the transfer volume to be lower than that if the primary field strength were uniformly or nearly uniformly present throughout the whole of the transfer volume 112. This reduced integrated field may reduce the power available to transfer power, transfer signals (e.g., RF communication signals), and/or for various other remote signaling applications. Thus, in some implementations there may be trade-off between field cancellation within in the protected volume and power left for use in the application of the primary field.

The volumes may be virtually any shape in three-dimensional space that may be surrounded by coil windings. For example, a coil may be wound around three-dimensional mold which may be removed after the winding is created. Thus, virtually any three-dimensional form may be enclosed by a winding. In some implementations, three-dimensional prisms, cylinders with various cross sections (e.g., with circular, rectangular, triangular, other polygonal, or other planar shape) may be used. Complex three-dimensional forms may also or alternatively be used.

Additionally or alternatively, various relative coil placements may be used. In the example field cancellation device 100, the primary coil 110 and cancellation coil 120 are shown as non-concentric. However, in various implementations concentric (or otherwise centered) relative positionings may be used. Additionally or alternatively, the relative positionings of the coils may be skewed (or centered) in three-dimensions although only two dimensions are shown in FIG. 1 for the purposes of clarity of presentation.

The field cancellation device 100 may further include a balancing inductor 130. The balancing inductor may be electrically-coupled to the cancellation coil 120 to balance the signal level running through primary coil 110 and the cancellation coil 120. For example, the primary coil 110 and the cancellation coil 120 may be coupled in parallel (such that they receive a signal together). For example, the balancing inductor may be coupled in series with the cancellation coil 120 and in parallel with the primary coil 110.

The signal-level balancing of the balancing inductor may allow selection of portion of the field cancelled by the cancellation coil 120. In various implementations, the primary coil 110 and cancellation coil 120 may be wound in opposite directions, such that they generate fields of opposite polarity as the respective portions of the signal runs through their coils.

The relative portion of the signal that goes through the cancellation coil 120 may be controlled by changing the characteristics of the balancing inductor 130. In other words, adjusting the inductance of the balancing inductor 130, may change a portion of the current that flows through the cancellation coil 120. Thus, the balancing inductor 130 may balance the primary coil 110 and cancellation coil 120, which (at least in some implementations) may obviate providing separate signals to the respective coils to optimize signal cancellation.

The core material for the coils 110, 120 and/or balancing inductor 130 may vary with various implementations. For example, iron (or other ferrite) cores may be used. Air cores may be used. Dielectric cores may be used. Semiconductor materials may be present in the core. Magnetic cores may be used. Various other inductor core types may be used. Air cores may allow for the inclusion of (e.g., field-sensitive) devices within the protected volume. Hybrid (e.g., multi-material) cores may be used. For example, ferrite, partially ferrite and/or non-ferrite magnetic cores may be used. Cores may include an "air" portion where protected devices may be included. In some cases, the core of the coil may vary along one or more dimensions of the volume corresponding to the coil. For example, a cylinder shaped volume may include a sandwich-like structure with non-air-core elements above and/or below an air core (which may, in some cases, include protected objects. For example, a transfer volume may include non-air-core elements outside of one or more corresponding protected volumes with one or more air cores making up the protected volume to allow for the inclusion of protected objects.

In some implementations, using core materials that may enhance the transfer field interaction (e.g., such as magnetic material, and/or other induction enhancement cores) may reduce trade-offs between field cancellation and transfer field power (e.g., available for use in an application of the cancellation device).

The field cancellation device 100 may further include driver circuitry 140 and/or one or more protected objects 150. The driver circuitry 140 (e.g., which may include RF tuners, power converters (such as boost power converters, current mode power converters, buck power converters, and/or other power converter types), amplifiers, and/or other power transfer/transceiver circuitry) may include circuitry to support the operation of the primary coil 110 and/or the cancellation operation of the cancellation coil 120. The protected object 150 may include circuitry (which may include the driver circuitry 140, e.g., field-sensitive driver circuitry) that is protected by the cancellation coil 120 within the protected volume 122. The protected object 150 may include virtually any object (e.g., field-sensitive circuitry, a field-sensitive portion of an integrated chip, organic tissue, and/or other object) that may be present within the transfer volume 112 but would be affected by the primary field if exposed to the full primary field strength without the cancellation effect provided by the cancellation coil 120.

Figure 2:
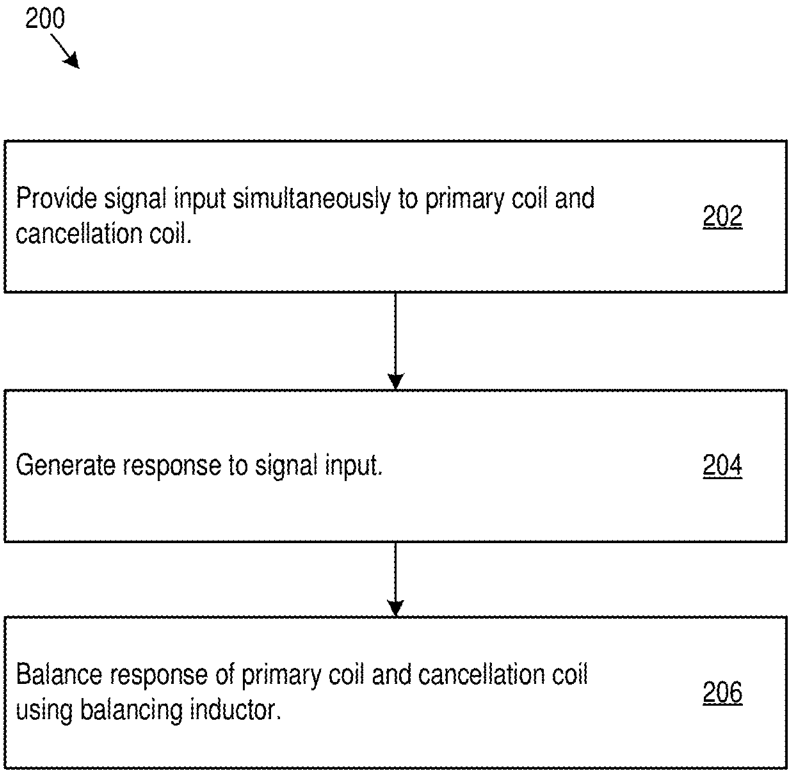
FIG. 2 shows an example method for field cancellation.

Referring now to FIG. 2, a method 200 for field cancellation that may be used in conjunction with the example field cancellation device 100 is shown. A signal input may be simultaneously provided to the primary coil 110 and cancellation coil 120 (202). For example, in a reception use case, the signal may include a transmitted field incident on the transfer volume 112 and protected volume 122 (e.g., as part of the transfer volume 112). For example, in a transmission use case, the signal may include a current sent through the coils.

The coils 110, 120 may generate a response to the signal input (204). In the example reception use case, the response by the coils 110, 120 may include inducing corresponding currents within the coils which may in turn generate fields within the volumes. For example, the induced current in the primary coil may have the effect of generating a "primary field" that effectively reduces the field strength from the incident transmitted field, e.g., to effect WPT and/or receive a modulated information signal. The current induced in the cancellation coil may generate a "cancellation field" with a cancellation effect, e.g., on both incident transmitted field and the "primary field" generated by the primary coil 110. In the reception use case, both the primary field and cancellation field may be interference fields that reduce the field strength of the incident transmitted field. In the example transmission use case, the response may include in generating the primary and incident fields in response to the current fed to the coils. The primary field may have some power flux to effect power and/or information signal transfer, while the cancellation field may include an interference field that reduces the field strength the primary field within the protected volume 122.

The balancing inductor may balance the response of primary coil and the cancellation coil to the signal input (206). The electrical coupling between the balancing inductor 130 and the cancellation coil 120 may operate to control the current level within the cancellation coil 120. This control allows for selection of the portion of the primary field (and/or incident transmitted field) that is cancelled by the cancellation field. The sizing of the balancing inductor 130 may be selected to control this portion.

In some implementations, a fixed inductor may be used as the balancing inductor 130. The size of the balancing inductor 130 for fixed inductor designs may be selected upon design/manufacture of the field cancellation device 100. In some implementations, a variable inductor (e.g., such as a tap changing inductor, a slug-tuned inductor, or other variable inductor type), may be used. The variable inductor to optimize field cancellation and/or select the portion of the field cancelled.

In various implementations multiple cancellation coils may be used. For example, multiple cancellation coils may be paired to the same primary coil. For example, the multiple cancellation coils may create multiple protected volumes within the transfer volume. For example, the multiple cancellation coils may be positioned relative to one another to protect a selected volume in three-dimensional space. For example, the multiple cancellation coils may be nested within one another to provide varying degrees of cancellation. Various combinations of parallel positioning, stacking, and nesting may be used depending on the application of the cancellation coils. Other multiple coil positioning schemes may be used.

Additionally or alternatively, various implementations may include multiple primary coils. For example, each of the primary coils may have one or more paired cancellation coils. The configuration of the multiple primary coils may depend on the application. However, similar to multiple-cancellation-coil implementations, various primary-coil positioning schemes (e.g., stacking, nesting, parallel positioning, and/or other configurations in three-dimensional space) may be used.

Figure 3:
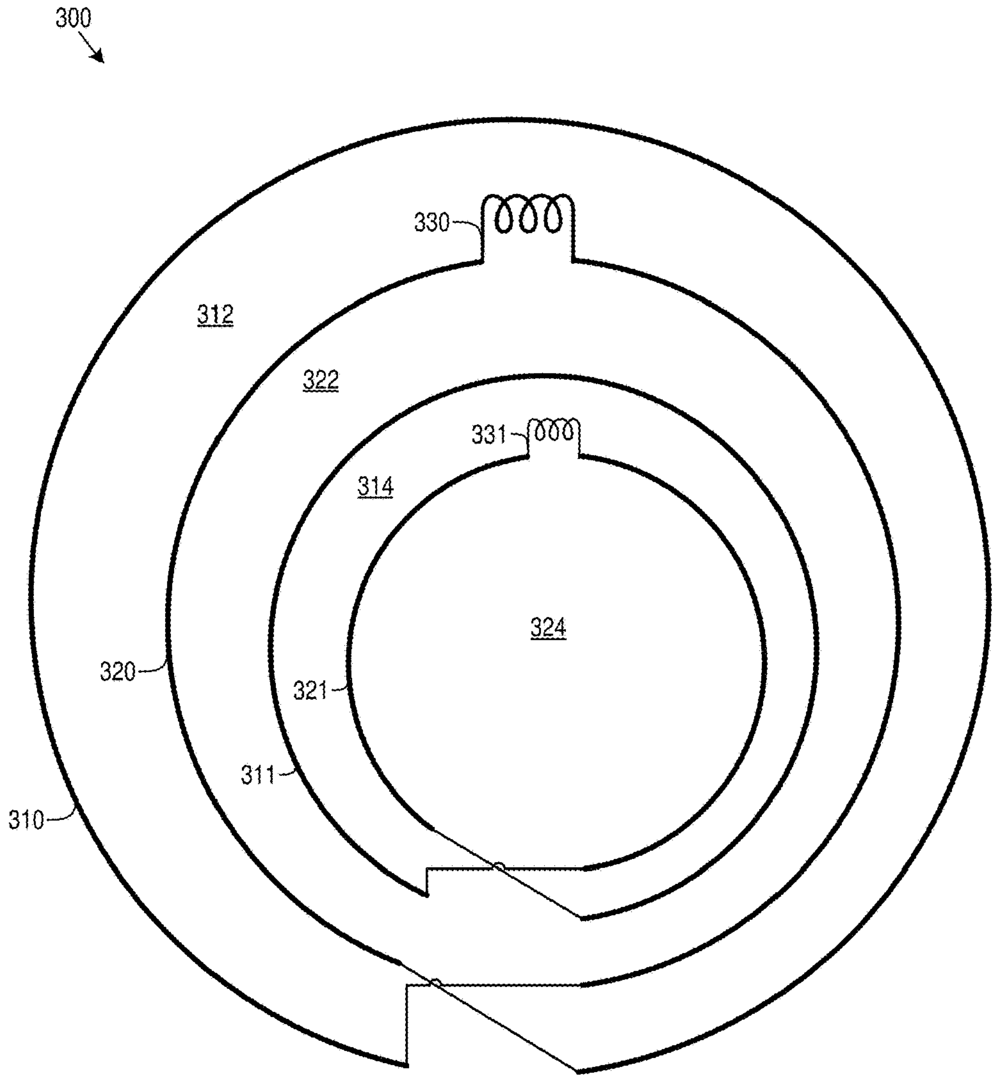
FIG. 3 shows an example multiple coil cancellation device.

FIG. 3 shows an example multiple coil cancellation device 300. In the multiple coil cancellation device 300, the multiple primary coils 310, 311 and multiple cancellation coils 320, 321 are alternately nested. The alternating nesting configuration creates a first transfer volume 312 with a first protected volume 322 within the first transfer volume 312. A second transfer volume 314 is in within the first protected volume 322. The primary field of the second primary coil 311 in the second transfer volume 314 is not handled by the first cancellation coil 320 because that coil is paired to the first primary coil 310. Thus, a second cancellation coil 321 is paired to the second primary coil 311 to create a second protected volume 324 within the second transfer volume. The first balancing inductor 330 is electrically-coupled to the first cancellation coil 320 and balances signal distribution to effect cancellation of the primary field of the first primary coil 310. The second balancing inductor 331 is electrically-coupled to the second cancellation coil 321 and balances signal distribution to effect cancellation of the primary field of the second primary coil 311.

In various implementations, the multiple coils may be arranged in various configurations. For example, a stack of or concentric multiple coils driven by a single driver may be used to manipulate the magnetic field distribution profile over a 2D area or a 3D volume. For example concentric multiple coils may be on the same plane or may be on the different planes. The total number of the coils can be odd or even. As discussed above, the primary coil and cancelling coil do not necessarily have to one-to-one correspondence.

Additionally or alternatively, adjacent coils may be coupled to have the same direction the current flow or opposite direction flow. The current in the multiple coils may have different amplitudes or phases. For example, the field of the coils can be augmented or decreased over a specific area, e.g., via phase driven shaping effects.

The coils may be implemented using traces on a multi-layer printed circuit board (PCB). The coils, the circuits, and/or components may be implemented on a multi-layer PCB.

In some implementations, multiple coil configuration may be used to manipulate the field distribution over a volume, e.g., for complex field-shaping. Using combinations of primary coils and cancellation coils, virtually any desired field shape and intensity distribution may be carved out in three-dimensional space.

Example Implementations

Various example implementations are described below. The example implementations are illustrative of the various general architectures described above. The various specific features of the illustrative example implementations may be readily used in other implementations with or without the various other specific features of the implementation in which they are described.

Figure 4B:
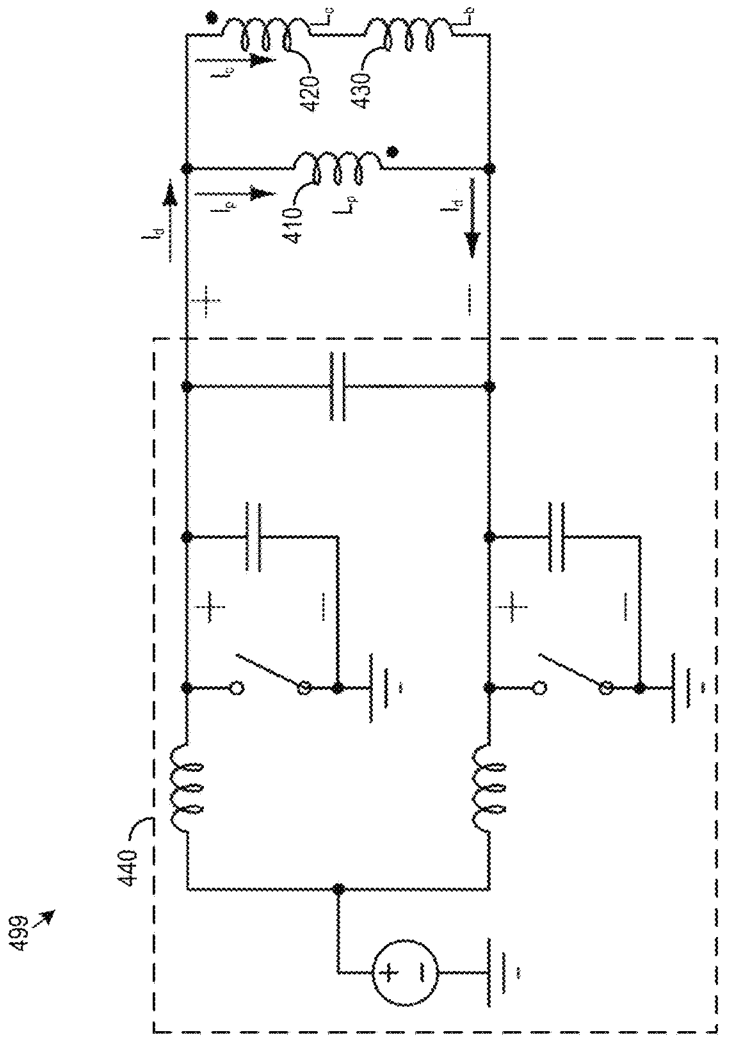
FIG. 4B shows a circuit diagram view for the illustrative example coil cancellation device of FIG. 4A.
Figure 4A:
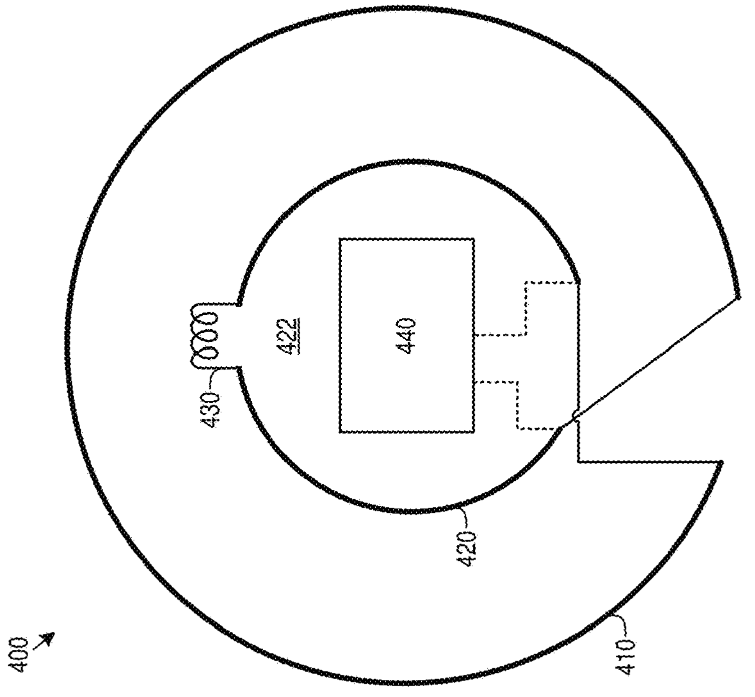
FIG. 4A shows a coil layout view for an illustrative example coil cancellation device.

FIG. 4A shows a coil layout view 400 for an illustrative example field cancellation device. FIG. 4B shows a circuit diagram 499 for the illustrative example field cancellation device. The primary coil 410, which has inductance ($L_p$), encircles the cancellation coil 420, which has inductance ($L_c$), as shown in FIG. 4A. The coils 410, 420 are coupled in parallel to driver circuitry 440. The balancing inductor 430 is coupled in series to the cancellation coil 420 and in parallel to the primary coil 410. The driver circuitry 440 is configured as a single current mode class D (CMCD) power converter. The current ($I_d$) handled by the driver circuitry 440, is split into primary ($I_p$) and cancellation ($I_c$) components. The balance between the primary ($I_p$) and cancellation ($I_c$) components is determined based on the inductance ($L_b$) of the balancing inductor 430. As shown in FIG. 4A, the driver circuitry 440 may be encircled by the cancellation coil 420 and may be within the protected volume 422. Thus, the operation of the driver circuitry is protected from interference from operation of the primary coil 410 by the cancellation provided by the cancellation coil 420.

Various implementations have been specifically described. However, many other implementations are also possible. Table 1 shows various examples.

TABLE 1

| | Examples |
|---|---|
| 1. | A device including: a primary coil configured to, when driven by a driver signal, interact with a primary field within a first volume surrounded by the primary coil; a cancellation coil within the first volume, the cancellation coil configured to, when driven by the driver signal, generate a cancellation field to cancel at least a portion of a field strength within a second volume surrounded by the cancellation coil; and a balancing inductor electrically-coupled to the cancellation coil, the balancing inductor configured to control a cancellation balance between the primary and cancellation fields; and field-sensitive driver circuitry disposed within the second volume, the field-sensitive driver circuitry output coupled to simultaneously provide the driver signal to the primary coil and cancellation coil, where: optionally, the device is in accord with any other example in this table. |
| 2. | The device of any other example in this table, further including: a second cancellation coil within the first volume the cancellation coil configured to, when driven by the driver signal, generate a second cancellation field to cancel at least a portion of the primary field within a third volume surrounded by the second cancellation coil and different from the second volume; and a second balancing inductor electrically-coupled to the second cancellation coil. |
| 3. | The device of any other example in this table, further including: multiple cancellation coils within the first volume, the multiple cancellation coils including the cancellation coil, each of the multiple cancellation coils configured to, when driven by the driver signal, generate a respective cancellation field to cancel at least a portion of the primary field within a respective volume surrounded by that cancellation coil; and multiple balancing inductors each electrically-coupled to a respective one of the multiple cancellation coils. |
| 4. | The device of any other example in this table, further including: a multiple cancellation coils including the cancellation coil; multiple primary coils including the primary coil, each of the multiple primary coils surrounding a respective one or more of the multiple cancellation coils; and multiple balancing inductors each electrically-coupled to a respective one of the multiple cancellation coils. |
| 5. | The device of any other example in this table, where the first and second volumes correspond to two-dimensional areas of an integrated chip. |
| 6. | The device of any other example in this table, where the first and second volumes correspond to cylindrical volumes surrounded by one or more windings of the coils. |
| 7. | The device of any other example in this table, where the first and second volumes have circular cross-sections or rectangular cross-sections. |
| 8. | The device of any other example in this table, further including a magnetic core within the balancing inductor. |
| 9. | The device of example 8 or any other example in this table, where the magnetic core includes a ferrite core. |
| 10. | The device of example 8 or any other example in this table, where the magnetic core is further disposed within the first volume and/or the second volume. |
| 11. | The device of any other example in this table, further including an air core within the first volume. |
| 12. | The device of any other example in this table, where the primary field and cancellation field include at least magnetic field components. |
| 13. | The device of any other example in this table, where the primary field includes a wireless power transfer field. |
| 14. | The device of any other example in this table, where the field-sensitive driver circuitry includes: wireless power transfer driver circuitry; very high frequency (VHF) driver circuitry; ultra high frequency (UHF) driver circuitry; a current mode power converter; and/or a gate driver circuit. |
| 15. | The device of any other example in this table, where the primary field includes a radio-frequency (RF) field. |
| 16. | A device including: a primary coil configured to interact with a primary field, the primary field within a first volume surrounded by the primary coil; a cancellation coil aligned with the primary coil within the first volume such that a cancellation field corresponding to the cancellation coil overlaps with the primary field over a second volume smaller than the first volume; and a balancing inductor electrically-coupled to the cancellation coil and misaligned with the primary coil and the cancellation coil, the balancing inductor sized to cause the cancellation field to cancel at least a selected portion of a field strength in the second volume when a signal is simultaneously incident on the primary coil and the cancellation coil, where: optionally, the device is in accord with any other example in this table. |
| 17. | The device of claim 16, further including a protected object within the second volume. |
| 18. | The device of example 17 or any other example in this table, where the protected object includes: driver circuitry configured to generate a response to the signal simultaneously incident on the primary coil and the cancellation coil; and/or an application circuit configured to support operation of the device other than current-level control within the primary coil and the cancellation coil. |
| 19. | A device including: a primary coil configured to generate a first current response a transmitted field incident on a first volume surrounded by the primary coil; a cancellation coil aligned with the primary coil within the first volume such that a cancellation field overlaps with the transmitted field over a second volume smaller than the first volume, the cancellation field generated by the cancellation coil based on a second current |

TABLE 1-continued

| Examples | |
|---|---|
| | response; and a balancing inductor electrically-coupled to the cancellation coil and misaligned with the primary coil and the cancellation coil, the balancing inductor sized to balance the first and second current responses such that cancellation field cancels at least a selected portion of a strength of the transmitted field in the second volume, where: optionally, the device is in accord with any other example in this table. |
| 20. | The device of example 19 or any other example in this table, further including an application circuit configured to support operation of the device other than current-level control within the primary coil and the cancellation coil, where: the transmitted field includes a wireless power transfer field; and the primary coil is configured to supply power to the application circuit using power received via the transmitted field. |
| 21. | A method including: providing a signal input simultaneously to a primary coil and a cancellation coil; generating a response to the signal input at the primary coil and the cancellation coil; and balancing the generated response using a balancing inductor, where: optionally, the method is implemented using the device of any other example in this table. |
| 21. | The field cancellation device can be combined with virtually any other field cancellation methods or field manipulation methods, including ferrite sheets or various other metal sheets. |

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A device including:

a primary coil configured to, when driven by a driver signal, interact with a primary field within a first volume surrounded by the primary coil;

a cancellation coil within the first volume, the cancellation coil configured to, when driven by the driver signal, generate a cancellation field to cancel at least a portion of a field strength within a second volume surrounded by the cancellation coil; and a balancing inductor electrically-coupled to the cancellation coil, the balancing inductor configured to control a cancellation balance between the primary and cancellation fields; and field-sensitive driver circuitry disposed within the second volume, the field-sensitive driver circuitry output coupled to simultaneously provide the driver signal to the primary coil and cancellation coil.

2. The device of claim 1, further including:

a second cancellation coil within the first volume the cancellation coil configured to, when driven by the driver signal, generate a second cancellation field to cancel at least a portion of the primary field within a third volume surrounded by the second cancellation coil and different from the second volume; and a second balancing inductor electrically-coupled to the second cancellation coil.

3. The device of claim 1, further including:

multiple cancellation coils within the first volume, the multiple cancellation coils including the cancellation coil, each of the multiple cancellation coils configured to, when driven by the driver signal, generate a respective cancellation field to cancel at least a portion of the primary field within a respective volume surrounded by that cancellation coil; and multiple balancing inductors each electrically-coupled to a respective one of the multiple cancellation coils.

4. The device of claim 1, further including:

a multiple cancellation coils including the cancellation coil;

multiple primary coils including the primary coil, each of the multiple primary coils surrounding a respective one or more of the multiple cancellation coils; and multiple balancing inductors each electrically-coupled to a respective one of the multiple cancellation coils.

5. The device of claim 1, where the first and/or second volumes include two-dimensional areas of an integrated chip.

6. The device of claim 1, where the second volume includes a cylindrical volume surrounded by one or more windings of the cancellation coil.

7. The device of claim 1, where the first and second volumes have circular cross-sections or rectangular cross-sections.

8. The device of claim 1, further including a magnetic core within the balancing inductor.

9. The device of claim 8, where the magnetic core includes a ferrite core.

10. The device of claim 1, where the device further includes magnetic shielding covering at least a portion of the second volume.

11. The device of claim 1, further including an air core within the balancing inductor.

12. The device of claim 1, where the primary field and cancellation field include at least magnetic field components.

13. The device of claim 1, where the primary field includes a wireless power transfer field.

14. The device of claim 1, where the field-sensitive driver circuitry includes:

wireless power transfer driver circuitry;

very high frequency (VHF) driver circuitry;

ultra high frequency (UHF) driver circuitry;

a current mode power converter; and/or a gate driver circuit.

15. The device of claim 1, where the primary field includes a radio-frequency (RF) field.

16. A device including:

a primary coil configured to interact with a primary field, the primary field within a first volume surrounded by the primary coil;

a cancellation coil aligned with the primary coil within the first volume such that a cancellation field corresponding to the cancellation coil overlaps with the primary field over a second volume smaller than the first volume; and a balancing inductor electrically-coupled to the cancellation coil and misaligned with the primary coil and the cancellation coil, the balancing inductor sized to cause the cancellation field to cancel at least a selected portion of a field strength in the second volume when a signal is simultaneously incident on the primary coil and the cancellation coil.

17. The device of claim 16, further including a protected object within the second volume.

18. The device of claim 17, where the protected object includes:

driver circuitry configured to generate a response to the signal simultaneously incident on the primary coil and the cancellation coil; and/or an application circuit configured to support operation of the device other than current-level control within the primary coil and the cancellation coil.

19. A device including:

a primary coil configured to generate a first current response to a transmitted field incident on a first volume surrounded by the primary coil;

a cancellation coil aligned with the primary coil within the first volume such that a cancellation field overlaps with the transmitted field over a second volume smaller than the first volume, the cancellation field generated by the cancellation coil based on a second current response; and a balancing inductor electrically-coupled to the cancellation coil and misaligned with the primary coil and the cancellation coil, the balancing inductor sized to balance the first and second current responses such that cancellation field cancels at least a selected portion of a strength of the transmitted field in the second volume.

20. The device of claim 19, further including an application circuit configured to support operation of the device other than current-level control within the primary coil and the cancellation coil, where:

the transmitted field includes a wireless power transfer field; and the primary coil is configured to supply power to the application circuit using power received via the transmitted field.

* * * * *